J. BALAZS.
TIRE FOR VEHICLE WHEELS.
APPLICATION FILED JUNE 17, 1911.

1,023,712.

Patented Apr. 16, 1912.

WITNESSES:
Samuel Payne
R. H. Butler

INVENTOR.
John Balazs.
BY H. C. Evert & Co.
ATTORNEYS

COLUMBIA PLANOGRAPH CO., WASHINGTON, D. C.

UNITED STATES PATENT OFFICE.

JOHN BALAZS, OF MICHEL, BRITISH COLUMBIA, CANADA, ASSIGNOR OF ONE-FOURTH TO UNOKA MIHALJ, ONE-FOURTH TO MANDI BALINT, AND ONE-FOURTH TO G. HEKKEL, ALL OF MICHEL, CANADA.

TIRE FOR VEHICLE-WHEELS.

1,023,712.  Specification of Letters Patent.  Patented Apr. 16, 1912.

Application filed June 17, 1911. Serial No. 633,661.

*To all whom it may concern:*

Be it known that I, JOHN BALAZS, a subject of the King of Hungary, residing at Michel, British Columbia, Canada, have invented certain new and useful Improvements in Tires for Vehicle-Wheels, of which the following is a specification, reference being had therein to the accompanying drawings.

This invention relates to tires for vehicle wheels, and more particularly to pneumatic tires for automobiles and motor driven vehicles.

The object of my invention is to furnish the rim of a wheel with a novel yieldable cushion for the outer tube of a pneumatic tire, the cushion preventing the rim or felly of the wheel from cutting or otherwise injuring the outer tube.

Another object of this invention is to furnish a wheel with a laminated strength reinforced cushion that can be easily installed, manufactured at a comparatively small cost and used to an advantage in connection with trucks and heavy drays.

The above objects are maintained by a mechanical construction that will be hereinafter specifically described and then claimed, and reference will now be had to the drawings wherein—

Figure 1:
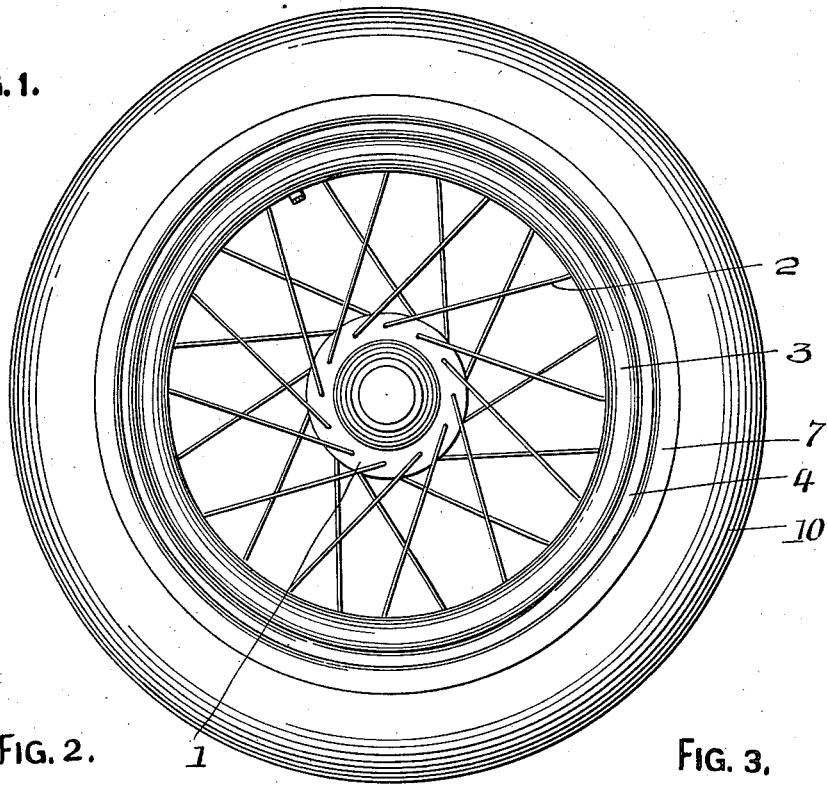
Figure 2:
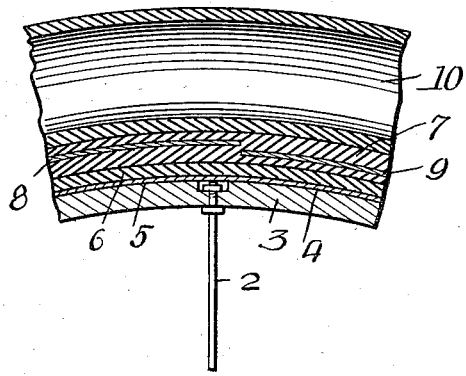
Figure 3:
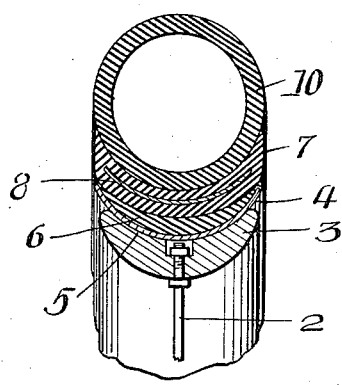

Figure 1 is a side elevation of a wheel in accordance with this invention. Fig. 2 is an enlarged longitudinal sectional view of a portion of the tire, and Fig. 3 is a cross-sectional view of the same.

The reference numeral 1 denotes an ordinary and well known type of hub having tangentially disposed spokes 2 supporting a rim or felly 3. Arranged circumferentially of the rim or felly 3 is a sheath 4, preferably made of leather, whereby it can be curved to conform to the annular groove 5, of the rim or felly 3, the sheath in cross-section having a crescent shaped configuration. Arranged circumferentially of the sheath and having a crescent shaped configuration is a filler block 6, preferably made of rubber and having the upper edges thereof flush with the edges of the sheath. Arranged upon the filler block 6 is a cushion 7, preferably made of rubber in which there are embedded a plurality of circumferentially arranged strips 8 and 9 of leather or other durable material. The strips 8 are arranged closer to the outer face of the cushion than the strips 9, and these strips have the side edges thereof in proximity to the side edges of the cushion. The cushion in cross-section has a crescent shaped configuration and this cushion is adapted to support the outer tube 10 of a pneumatic tire, it being understood that the inner tube is arranged within the outer tube and suitable provision made for inflating the inner tube.

The sheath 4 prevents the filler block 6 from being cut by the edges of the rim or felly, the filler block 6 provides a firm foundation for the cushion, and the cushion provides a yieldable seat for the outer tube.

What I claim is:—

1. The combination with the felly of a wheel and an outer tube adapted to be supported thereby, of a leather sheath arranged circumferentially of said felly, a rubber filler block arranged circumferentially of said sheath, and having its edges flush with those of the sheath, a rubber cushion arranged circumferentially of said filler block and adapted to support said outer tube, and leather strips circumferentially embedded in said cushion, and certain of said strips arranged closer to the outer face thereof than others of said strips and with their side edges lying in proximity to the side edges of the cushion.

2. The combination with the felly of a wheel, and the outer tube of the tire, of a sheath arranged upon said felly, a filler block arranged circumferentially of said sheath, a rubber cushion arranged circumferentially of said filler block and adapted to support said outer tube, and strips of leather embedded within said cushion with some of said strips closer to the outer surface of said cushion than the other of said strips.

In testimony whereof I affix my signature in the presence of two witnesses.

JOHN BALAZS.

Witnesses:
MIKE BERNOL,
JOSEPH DUDSEL.

Copies of this patent may be obtained for five cents each, by addressing the "Commissioner of Patents, Washington, D. C."